United States Patent [19]
Maron

[11] Patent Number: 5,233,376
[45] Date of Patent: Aug. 3, 1993

[54] FILM SLIDE FEEDER

[76] Inventor: Stanislav Maron, 7801 N. 54th St., Paradise Valley, Ariz. 85253

[21] Appl. No.: 890,939

[22] Filed: May 29, 1992

[51] Int. Cl.⁵ .......................................... G03B 23/04
[52] U.S. Cl. .................................. 353/103; 353/116; 353/113
[58] Field of Search ............... 353/116, 114, 113, 112, 353/111, 103, 118

[56] References Cited

U.S. PATENT DOCUMENTS

| | | | |
|---|---|---|---|
| 1,839,545 | 1/1932 | Frye | 353/113 |
| 2,260,660 | 10/1941 | Darwin | 353/113 |
| 2,310,047 | 2/1943 | Waldeyer | 353/113 |
| 2,533,441 | 12/1950 | Estes | 353/113 |
| 2,904,914 | 9/1959 | Trubert | 353/113 |
| 3,419,982 | 1/1969 | Heisler | 353/DIG. 1 |
| 3,493,298 | 2/1970 | Sylla | 353/114 |
| 3,598,483 | 8/1971 | Galbraith, Jr. | 353/113 |

Primary Examiner—William A. Cuchlinski, Jr.
Assistant Examiner—William C. Dowling
Attorney, Agent, or Firm—Cahill, Sutton & Thomas

[57] ABSTRACT

A film slide feeder serially translates each slide from a feed hopper through a slide tray extending through imaging equipment to a receive hopper for duplicating, digitizing or superimposing the image presented by each slide to the imaging equipment.

23 Claims, 4 Drawing Sheets

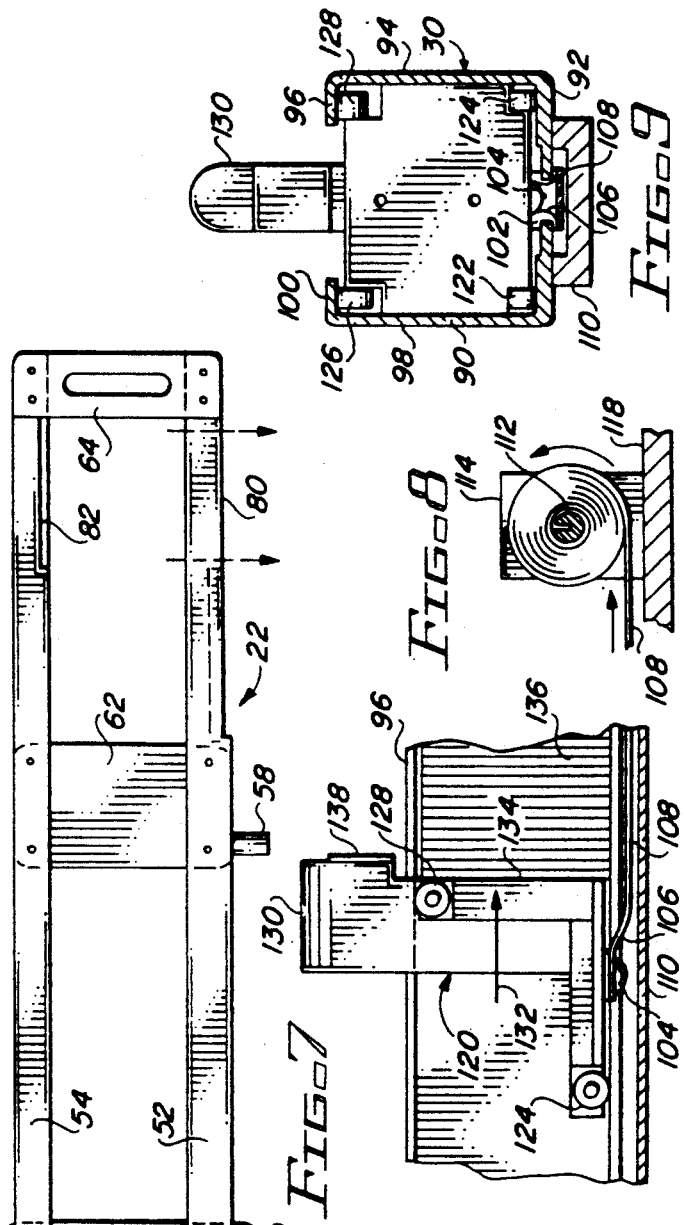

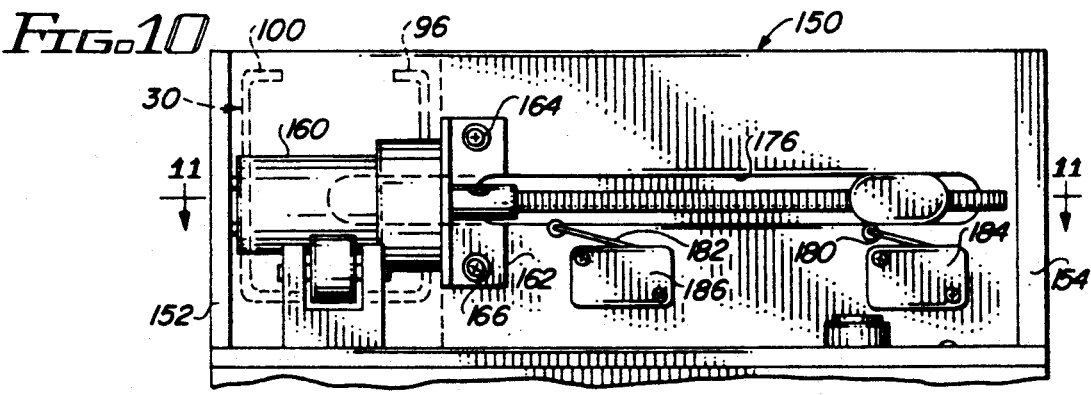
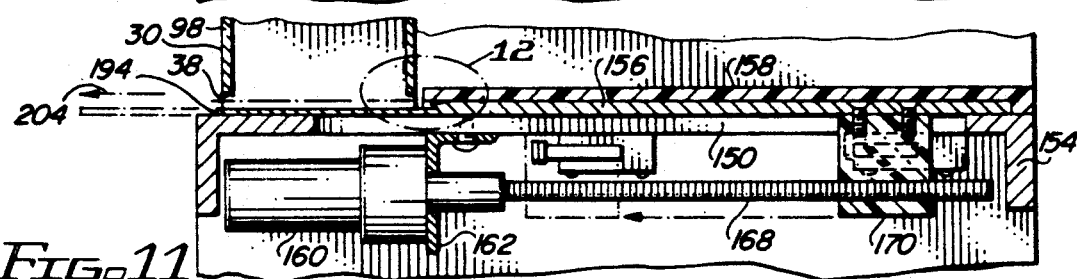
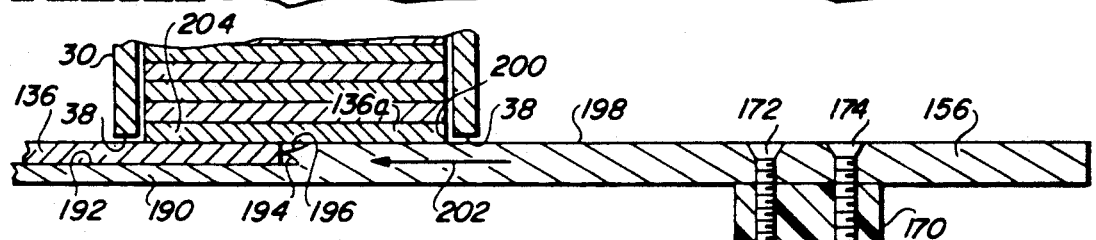
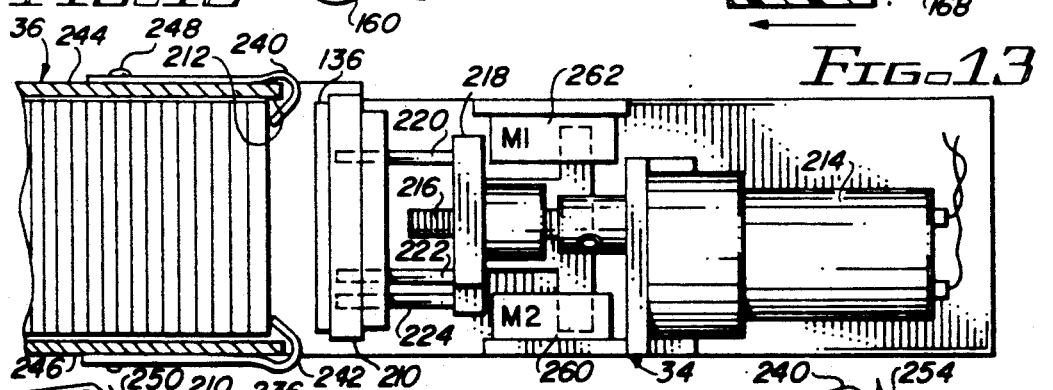
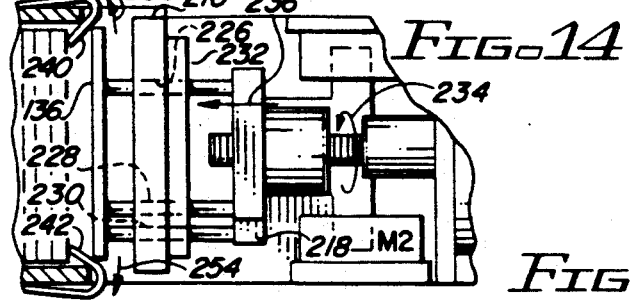
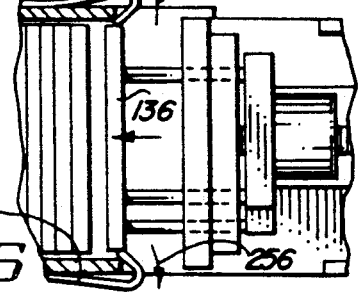

FILM SLIDE FEEDER

BACKGROUND OF THE INVENTION

1. Field of the Invention

The present invention relates to feed mechanisms and, more particularly, to feed and receive mechanisms for translating film slides past imaging equipment.

2. Description of the Prior Art

Projectors for displaying an image presented by a film slide incorporate various types of magazines for containing the film slides prior and subsequent to projection. A commonly used projector employs a carousel or circular slide holder. The carousel, either horizontally or vertically oriented, rotates incrementally and at each stop a slide is dropped by gravity or pushed to a position in the projector for projection. Thereafter, the slide is raised or returned into its former position within the carousel and the carousel rotates incrementally for projecting the succeeding slide. Elongated slide trays for projectors are incrementally linearly translated. At each stop, gripping elements translate the slide laterally from the tray to a location for projection and return. Slide feeders for feeding slides serially from a stack of slides into a projector are known. Generally, these feeders serially remove a slide from a first stack, project it and deposit it on a second stack. Reciprocating slide trays for serially engaging each slide, translating it to a point of projection and depositing the projected slide are known.

Apparatus for duplicating film slides is available from a number of manufacturers. Similarly, apparatus for scanning and digitizing the image of a film slide is available from a number of manufacturers. Related apparatus is also available for creating a composite image of two or more film slides by combining all or part of the image of two or more film slides. Primarily for archival purposes, film slide duplicating equipment, whether photographically duplicating or scanning and digitizing, is preferably operated automatically without operator assistance. This permits the equipment to operate during off work hours as well as during work hours. To duplicate or digitize a batch of 300 or so film slides will take a number of hours, based upon the capability of presently available equipment. To ensure continuous operation, especially during non attended processing, the apparatus feeding the film slides to and receiving the film slides from the equipment must work with a very high degree of reliability.

SUMMARY OF THE INVENTION

A feed hopper containing a batch of film slides supplies the slides to a reciprocating tongue of a slide feeder. The tongue provides a supporting surface for maintaining the side upright and a slide engaging element urges transport of the slide while precluding engaging more than one slide at a time from the feed hopper. The tongue serially transports each slide to a slide tray. The slide tray is positionally keyed to imaging equipment for duplicating or digitizing the image on the slide and serially locates each slide for and during the duplication or digitizing process. Each slide is further translated to an outlet of the slide tray and dropped therethrough to a slide receiver for serially stacking each slide in a receive hopper. A platform interconnecting the feed hopper, the slide feeder, the slide receiver and the receive hopper accurately positions the imaging equipment therebetween. The slide tray is keyed to the imaging equipment and is automatically positionally correlated with the slide feeder and slide receiver. Control signals generated by operation of the imaging equipment may be used as a trigger to operate the slide feeder and the slide receiver.

It is therefore a primary object of the present invention to provide slide feed apparatus for use with slide imaging equipment.

Another object of the present invention is to provide an automatic slide feeder for serially translating a batch of slides through slide duplicating or digitizing equipment.

Yet another object of the present invention is to provide apparatus for mechanically transporting each slide serially from a feed hopper past slide duplicating or digitizing equipment to a receive hopper.

Still another object of the present invention is to provide a slide transport tongue which simultaneously engages only one slide and discourages simultaneous engagement of a second slide from a feed hopper.

A further object of the present invention is to provide a discharge port in a slide tray which uses a following slide to ensure discharge urged by gravity.

A yet further object of the present invention is to provide a ram for loading a receive hopper with slides dropped from a slide tray.

A still further object of the present invention is to provide a method for serially transporting a batch of film slides past imaging equipment.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 3 is a cross-sectional view take along lines 3—3, as shown in FIG. 2;

FIG. 4 is a view of the reverse side of the slide tray shown in FIG. 3;

FIG. 5 is a cross-sectional view taken along lines 5—5, as shown in FIG. 3;

FIG. 6 is a cross-sectional view taken along lines 6—6, as shown in FIG. 2;

FIG. 7 is a cross-sectional view taken along lines 7—7, as shown in FIG. 2;

FIG. 8 is a cross-sectional view taken along lines 8—8, as shown in FIG. 2;

FIG. 9 is a cross-sectional view taken along lines 9—9, as shown in FIG. 2;

FIG. 10 is a front view of the jack screw apparatus for use in conjunction with a slide transport tongue;

FIG. 11 is a cross-sectional view taken along lines 11—11, as shown in FIG. 10;

FIG. 12 is a detail view of the structure illustrated within dashed circle 12 shown in FIG. 11; and FIGS. 13, 14 and 15 illustrate steps for loading a film slide into a receive hopper.

DESCRIPTION OF THE PREFERRED EMBODIMENT

Figure 1:
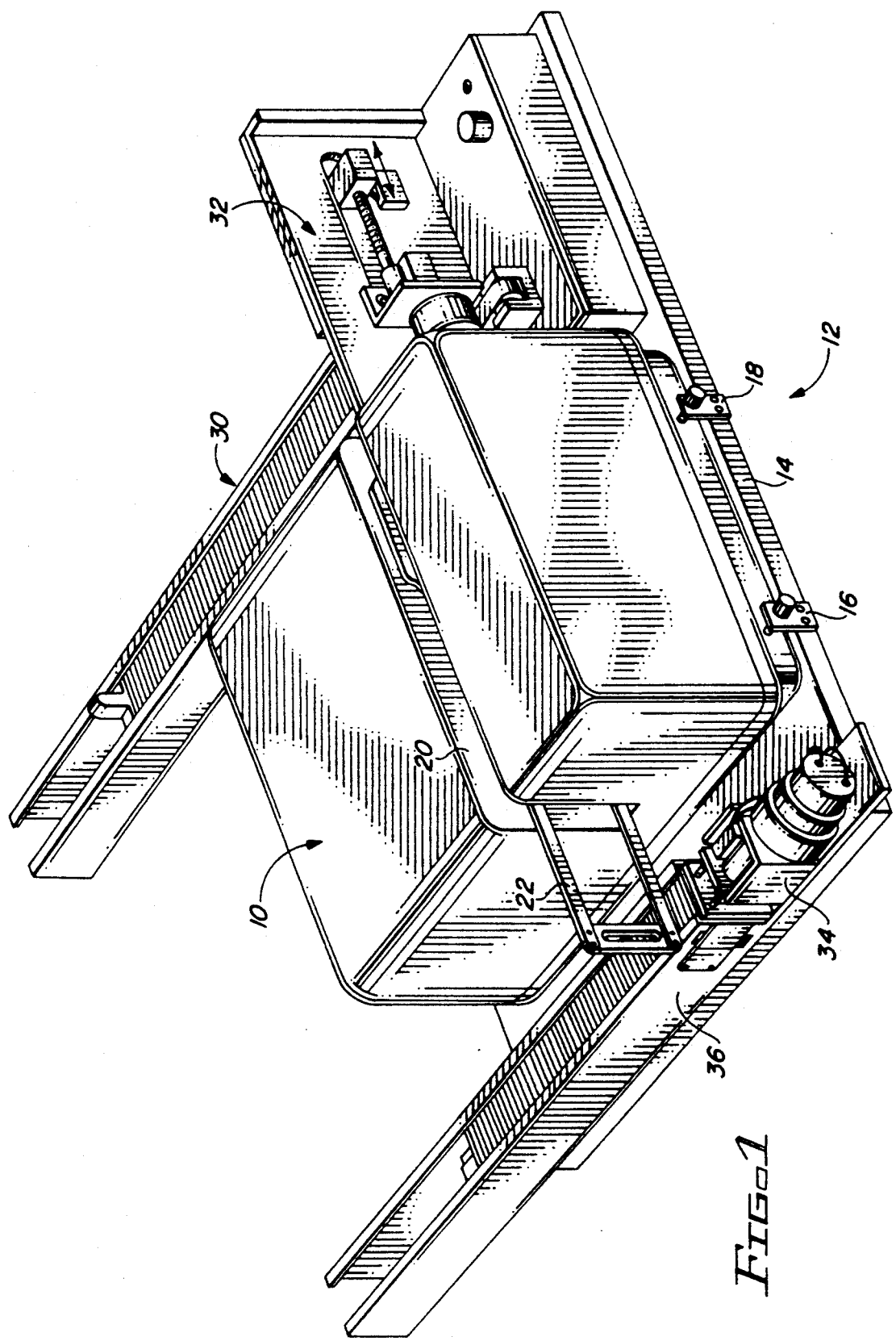
FIG. 1 is an isometric view illustrating slide feed apparatus useable in conjunction with imaging equipment for duplicating, digitizing or composing an image of a film slide.

Referring to FIG. 1, there is illustrated imaging equipment 10 for composing, duplicating, or recording the images on film slides by any of various processes, including scanning and digitizing processes. Furthermore, such equipment may be used for the purpose of superimposing all or parts of two or more images. Equipment of this type is readily available from numerous manufacturers. For archival purposes, the images of film slides (hereinafter slides) are usually scanned and digitized to permit storage and selective reproduction on demand at a later date.

It is not unusual to scan and digitize each slide of a batch of slides, which batch may include 300 slides. The present speed of operation of equipment 10 will require 6 to 8 hours to process 300 slides. Thus, such processing is preferably performed during non working hours assuming that the slide feed mechanism is capable of operating continuously without jamming or other technical problems. The apparatus illustrated in FIG. 1 in conjunction with equipment 10 provides the capability for automatically serially feeding a batch of 300 or more slides through the equipment.

Slide feed apparatus 12 includes a platform 14 for supporting equipment 10. The platform includes attachment elements, such as elements 16 and 18 illustrated, for securing equipment 10 in place. Keying means (not shown) are also employed to positionally fix equipment 10 with respect to platform 14. Equipment 10 includes a transverse slot 20 through which the slides are transported serially. The imaging elements attendant equipment 10, such as scanners, are positioned with respect to slot 20 to duplicate, record, and/or analyze the image on a slide positioned within the slot by a slide tray 22. The slide tray is configured to accommodate translation of the slides through slot 20 and the associated imaging equipment and to establish and maintain registration between the imaging equipment and the slide being imaged.

A feed hopper 30 is detachably attached to platform 14 to permit replacement of an empty feed hopper with a filled one. The feed hopper operates in conjunction with slide feeder 32 for feeding slides serially through slide tray 22. The slide feeder is positionally attached to platform 14 to maintain alignment with the slide tray and prevent jamming or misfeed due to misalignment. A slide receiver 34 receives slides discharged from slide tray 22. It is rigidly secured to platform 14 to establish and maintain a functional relationship with slide tray 22 to ensure alignment with and accurate transport of the slides from the slide tray to the slide receiver. A receive hopper 36 is detachably attached to platform 14 to permit removal of a filled receive hopper and replacement with an empty receive hopper. The receive hopper is aligned with slide receiver 34 to permit loading of the slides into the receive hopper without jamming of or damage to the slides.

Referring jointly to FIGS. 2, 3, 4 and 5, further details attendant slide tray 22 will be described. The purpose of slide tray 22 is to transport, serially, slides past the imaging or scanning element(s) of equipment 10. Such transport is accomplished by opposed facing channels 50, 52 formed in longerons 54, 56. The length of these longerons, are, in part, a function of the dimensions of slot 20 in equipment 10. The spacing between channels 50, 52 is a function of the size of the slides to be transported therewithin. Similarly, the widths of these channels is a function of the thickness of the slides. The slide tray may include a pin 58 mating with a correspondingly configured receiving element in slot 20. It is to be understood that other keying elements may also be used. The size and configuration of framing elements 60 interconnecting longerons 54, 56 and defining an aperture 62 corresponding with the image presented by the film (image) in the slide are configured to mate with corresponding structures attendant the viewing or scanning elements of equipment 10 within slot 20. Moreover, framing elements 60, engaging the corresponding elements within slot 20, positionally fix slide tray 20 longitudinally and vertically to establish registration between a slide superimposed with aperture 62 and the imaging or scanning elements of equipment 10. Additional cross members 62, 64 may be employed for dimensionally stabilizing longerons 54, 56 and/or for keying purposes with equipment 10 to stabilize the slide tray against movement and to maintain the slide tray in registration with the imaging or scanning equipment.

A leaf spring 66 secured to longeron 54 includes a first leaf 68 for stabilizing a slide inserted at entry 70 to the channels of the slide tray. A second leaf 72 stabilizes the slide in registration with aperture 62 defined by framing elements 60. A corresponding leaf spring 74 secured to longeron 56 includes a leaf 76 for stabilizing the other side of a slide inserted through entry 70. A second leaf 78, like leaf 72, stabilizes the slide in registration with aperture 62.

An exit or discharge outlet is provided at the opposite end of slide tray 22 by the absence of a base for channel 52. That is, outlet 80 is in the manner of a slot defined by opposed sides of longeron 56. The width of outlet 80 is commensurate with the width of the slide transported through the slide tray. By experimentation it has been found beneficial to form a cutaway section 82 in one side wall of the side walls of longeron 54 defining channel 50 and in correspondence with outlet 80.

Referring jointly to FIGS. 2, 7, 8 and 9, elements of feed hopper 30 will be described in further detail. The feed hopper is formed of an elongated tray 90 generally rectangular in lateral cross-section and dimensioned to conform with the perimeter of the slides to be inserted therein. It includes a bottom 92, an upwardly extending side wall 94 add an inwardly extending overhang 96. An opposite side wall 98 extends upwardly from bottom 92 and is terminated by an inwardly extending overhang 100. The two overhangs prevent upward withdrawal of any slides placed within the hopper. A longitudinally extending slot 102 is formed in bottom 92 to accommodate bolt head 104 and attachment 106 with retractor spring 108. An upwardly oriented channel member 110 provides a protective covering for retractor spring 108. The retractor spring extends to a rotatable pin 112 journalled between uprights 114, 116 extending from base plate 118 of slide feeder 32.

A dolly 120 is translatable along feed hopper 30 with the assistance of a pair of journalled wheels 122, 124 rolling along bottom 92 and a further pair of journalled wheels 126, 128 rolling along overhangs 100, 96 respectively. A handle 130 permits manual gripping of the dolly to move it rearwardly for purposes of loading the feed hopper or for other purposes. The translation of the dolly, urged by retractor spring 108, as depicted by arrow 132, will tend to cause pivotal movement of the dolly about wheels 122, 124 which movement is resisted by wheels 126, 128. In this position of the dolly, facing surface 134 of the dolly will be parallel with and bear against the full surface of the adjacent one of slides 136 located within feed hopper 30 forwardly of the dolly.

Referring jointly to FIGS. 2, 10, 11 and 12, the mechanism for transporting a slide 136 from feed hopper 30 into slide tray 22 will be described. A wall 150 having end segments 152, 154 extends upwardly from base 118 and serves as a supporting member for the apparatus translating a slide 136 into slide tray 22. A tongue 156 is translatably guided adjacent wall 150 by guide means, such as guide member 158. The guide member retains the tongue aligned along its longitudinal axis during reciprocating rectilinear translation of the tongue. Power for translating the tongue is provided by electric motor 160 secured to wall 150 through an angle bracket 162 attached to the wall by threaded bolts 164, 166 or the like. The electric motor, on command, rotates a jack screw 168 in a first or second direction. A follower 170, in threaded engagement with jack screw 168, translates in a first or second direction as a function of the direction of rotation of the jack screw. Follower 170 is attached to tongue 156 by countersunk bolts 172, 174. A slot 176 disposed in wall 150 accommodates travel of follower 170. Switch arms 180, 182 of miniature switches 184, 186 sense the position of follower 170 and provide an electrical signal upon engagement of the follower with the respective one of the switch arms. In the embodiment illustrated, switch 184 provides an electrical signal indicative of follower 170 and tongue 156 being in a first position and switch 186 provides an electrical signal indicative of the follower and the tongue being in a second position.

Tongue 156 includes a reduced thickness section 190 of a length essentially commensurate with the width of feed hopper 30 (as shown in FIG. 11) and the slide to be transported to the slide tray. The distance between surface 192 of section 190 and end 38 of feed hopper 30 is essentially equivalent to the thickness of a slide 136. Thus, in the position of the tongue as shown in FIG. 11, a slide adjacent surface 192 of the tongue would be just past end 38 of feed hopper 30. A knife edge 194 is formed at the junction between section 190 and the main body of tongue 156. The location of the knife edge is commensurate with approximately one-half the thickness of a slide 136 positioned adjacent surface 192, as illustrated in FIG. 12. Surface 196 extending from knife edge 194 to planar surface 198 of tongue 156 slopes toward the planar surface to discourage catching or jamming edge 200 of next adjacent slide 136a when the tongue is translated to its second position, as depicted by arrow 202. Upon movement of tongue 156 to its second position, as depicted by arrow 204 in FIG. 11 and as depicted by the phantom lines, knife edge 194 has cleared side wall 98 of feed hopper 30. Upon initial movement of the tongue from its first position to its second position, translation of slide 136 will cause the slide to enter into and be engaged by channels 50, 52 in slide tray 22. Upon translation of the tongue to its second position, all of slide 136 will have been pushed into the channels of the slide tray.

As serial registration of each slide 136 must occur with respect to aperture 162 in order to align each slide with the imaging or scanning elements of equipment 10, the extent of translation of tongue 156, in combination with the length of slide tray 22 upstream of the aperture must be carefully set to assure correct serial positioning of each slide with respect to aperture 62.

Upon translation of tongue 156 from its second position to its first position in a direction opposite to arrow 202 (see FIG. 12), end 204 of next succeeding slide 136a will tend to be urged toward surface 192 of section 190 as knife edge 194 passes it. Ultimately, edge 200 of slide 136a will slide down surface 196 and clear knife edge 194. At this point, slide 136a will rest adjacent surface 192 and the first position of tongue 156 will have been reestablished. Subsequent translation of the tongue to its second position will load slide 136a into slide tray 22 and displace slide 136 a commensurate distance along the slide tray. As is depicted in FIG. 7, dolly 120 includes a forwardly extending shoulder 138 for contacting wall 150 to prevent the tongue from jamming against the dolly when feed hopper 30 empties.

As a slide is translated incrementally along slide tray 22, the lower corner of a first slide adjacent discharge outlet 80 will tilt downwardly into the outlet as the weight of the slide past the edge of the outlet exceeds the weight of the remaining part of the first slide. The upper leading corner of the first slide will bear against the edge of cross-member 64. Upon further movement of a succeeding second slide, the trailing lower corner of the first slide will be pushed and the leading upper corner of the first slide will be forced to slide upwardly along the edge of cross-member 64 until the trailing lower corner of the first slide clears channel 52 and enters discharge outlet 80. At this point, the first slide will be essentially vertically oriented and drop downwardly through discharge outlet 80 by force of gravity.

Referring jointly to FIGS. 1, 2, 13, 14 and 15, transport of a slide discharged from slide tray 22 will be described. A slide 136 dropping through discharge outlet 80 of slide tray 22 will land adjacent plate 210 of slide receiver 34 and proximate mouth 212 of receive hopper 36. After a slide has dropped, electric motor 214 will be actuated to rotatably drive jack screw 216 attached to the motor. A threaded coupling 218 is threadedly engaged with the jack screw and will travel from a first position, shown in FIG. 13 to a second position shown in FIG. 15 in response to rotation of the jack screw. Coupling 218 includes one or more prongs 220, 222, 224 extending therefrom and serves in the manner of a ram. These prongs extend through commensurately located passageways 226, 228 and 230 formed in plate 210 and a companion plate 232. Engagement of the prongs with their respective passageways precludes rotation of the coupling 218 whereby, rotation of jack screw 216 in the direction shown by arrow 234 will result in movement of the coupling from the first position to a second position, as depicted by arrow 236. Upon rotation of the jack screw in the opposite direction, movement of coupling 218 will be from the second position to the first position.

Movement of prongs 220, 222, 224 in the direction depicted by arrow 236 will result in the prongs engaging slide 136 outside of the image area of the slide. These prongs will tend to transport the slide toward mouth 212 of receive hopper 236. Leaf springs 240, 242 are attached to side walls 244, 246 by rivets 248, 250 or the like. As slide 136 contacts leaf springs 240, 242, as illustrated in FIG. 14, the leaf springs will be forced outwardly, as depicted by arrows 252, 254, until the leaf springs finally clear the slide, as depicted in FIG. 15. Thereafter, the leaf springs will extend inwardly past the perimeter of the slide last loaded into the receive hopper. These leaf springs prevent discharge of any slides through mouth 212 of the receive hopper. For illustrative purposes, the last six slides loaded within the receive hopper have been enumerated as 1, 2, 3, 4, 5 and 6.

A miniature switch 260 senses travel of coupling 218 to its second position and the switch is actuated. Upon actuation of the switch, the direction of rotation of motor 214 is caused to reverse. With reverse rotation of jack screw 216, coupling 218 will return to the first position. Such return is sensed by miniature switch 262. As switch 262 is actuated, electric motor 214 will be de-energized and slide receiver 34 is ready to accept a further slide dropping from slide tray 22.

Figure 2:
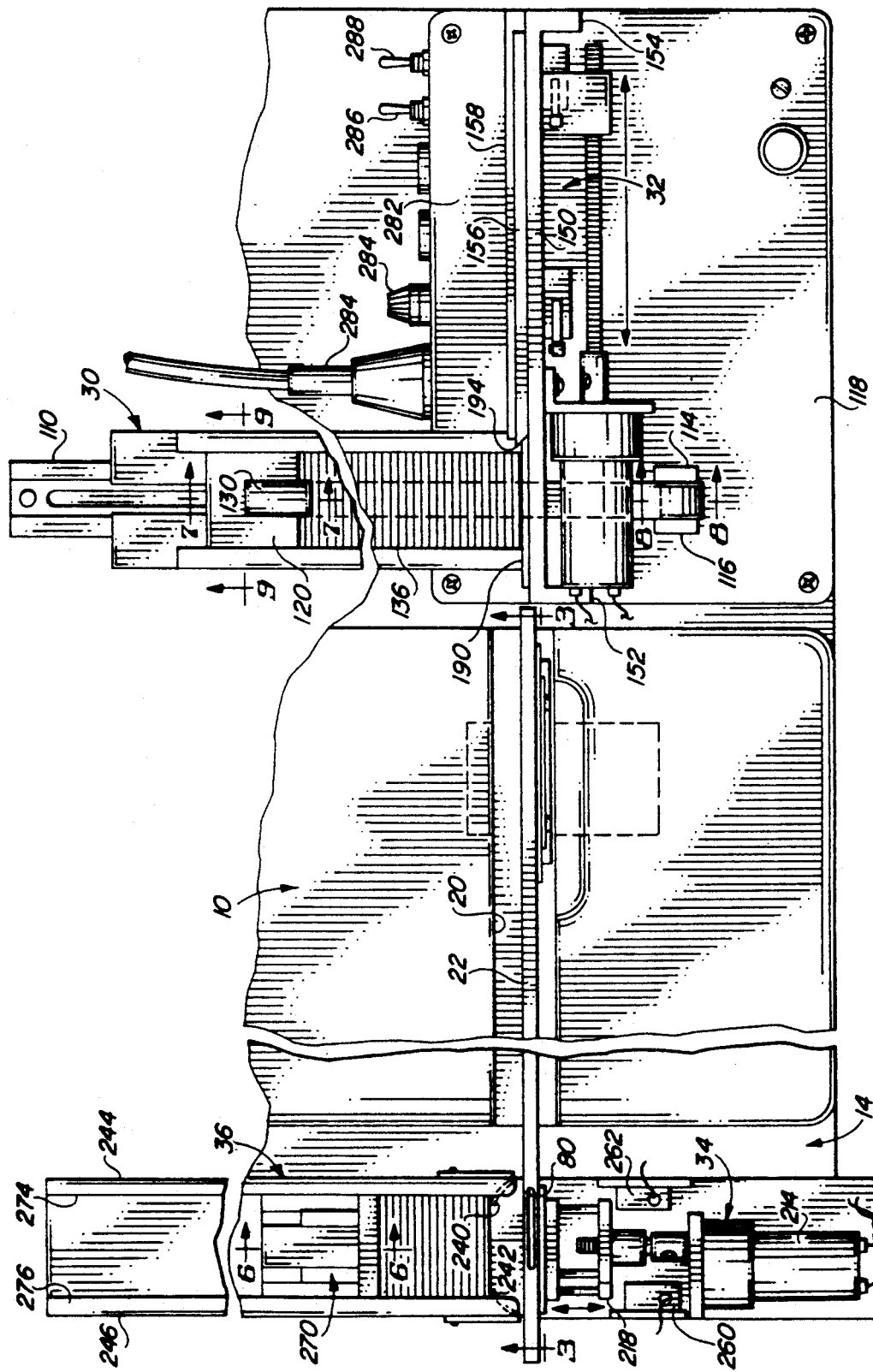
FIG. 2 is a top view of the apparatus and equipment illustrated in FIG. 1.

Referring jointly to FIGS. 1, 2 and 6, details attendant receive hopper 36 will be described. A bumper 270 includes an upright member 272 extending essentially between side walls 244, 246 of receive hopper 36 and of a height essentially commensurate with the distance between bottom 272 and upper inwardly oriented overhangs 274, 276. Movement of bumper 270 in the rearward direction, as depicted by arrow 278, is incremental as loading of receive hopper occurs through action of slide receiver 34. The primary purpose of the bumper is that of retaining the received slides in an upright orderly manner. Upon completion of a batch slides or on fill of receive hopper 36, bumper 270 maybe withdrawn through the rear open end of the hopper and the slides may be similarly withdrawn. Alternatively, the receive hopper may be disengaged from platform 14 and replaced with an empty receive hopper. It may be noted that as a result of leaf springs 240, 242 in combination with overhangs 274, 276 and bumper 270, the receive hopper may be handled without great fear of spillage of the slides contained therein provided only that the bumper be retained adjacent the slides.

As illustrated in FIG. 2, a source of electrical power is supplied by an electrical cord 280 plugged into an electrical module 282. A fuse 284 provides protection against electrical overload. Electrical switches 286, 288 may be used to delineate operation between single feed or continuous feed and may be used to control other functions, such as on/off. Various signals for controlling the operation of the electrical elements may be generated by module 282 and control or trigger signals generated by equipment 10 may be employed.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for serially feeding slides through slide imaging equipment, said apparatus comprising in combination:
    a) a slide tray for transporting slides serially through the slide imaging equipment;
    b) a feed hopper for providing a batch of slides to said slide tray;
    c) reciprocating tongue means for serially transporting slides from said feed hopper to said slide tray and means for urging the batch of slides toward said tongue means, each slide including opposed sides and an edge interconnecting the opposed sides and wherein said tongue means includes a section for supporting one side of the opposed sides of a slide and means for engaging the edge of the slide interconnecting the opposed sides; and
    d) a receive hopper for receiving the batch of slides from said slide tray, including means for serially stacking slides received from said slide tray.

2. The apparatus as set forth in claim 1 wherein said engaging means engages the edge of each slide inwardly of the interconnected opposed sides of the slide.

3. The apparatus as set forth in claim 2 wherein said engaging means includes a knife edge.

4. The apparatus as set forth in claim 3 including means for providing reciprocating motion to said tongue means.

5. The apparatus as set forth in claim 3 including means for registering said slide tray with the imaging equipment.

6. The apparatus as set forth in claim 3 wherein said slide tray includes an aperture for exposing the image of a slide retained by said slide tray and means for registering said aperture with the imaging equipment.

7. The apparatus as set forth in claim 1 including means for transporting said tongue means from a first position to a second position and return.

8. The apparatus as set forth in claim 7 wherein said transporting means includes a jack screw, a follower secured to said tongue means and in threaded engagement with said jack screw and a motor for rotating said jack screw in each direction.

9. The apparatus as set forth in claim 7 including guide means for guiding the reciprocating movement of said tongue means.

10. A method for serially feeding slides through imaging equipment, said method comprising the steps of:
    a) transporting slides serially through the imaging equipment and within a slide tray;
    b) providing a batch of slides from a feed hopper to the slide tray, including the step of serially transporting slides from the feed hopper to the slide tray with a reciprocating tongue;
    c) discharging each slide from the slide tray through an outlet in response to the force of gravity; and
    d) receiving the batch of slides from the slide tray in a receive hopper, including the step of serially stacking the slides received from the slide tray.

11. The method as set forth in claim 10 including the step of urging the slides within the feed hopper toward the reciprocating tongue.

12. The method as set forth in claim 10 including the step of engaging the edge of each slide inwardly of the opposing surfaces of the slide with the reciprocating tongue.

13. The method as set forth in claim 10 including the step of registering the slide tray with the imaging equipment.

14. The method as set forth in claim 10 wherein said step of stacking includes the step of serially translating each slide received from the slide tray into the receive hopper.

15. Apparatus for serially feeding slides through slide imaging equipment, said apparatus comprising in combination:
    a) a slide tray for transporting slides serially through the slide imaging equipment, each slide including opposed edges and wherein said slide tray includes opposed facing channels for receiving the opposed edges of each slide;
    b) a feed hopper for providing a batch of slides to said slide tray, including reciprocating tongue means for serially transporting slides from said feed hopper to said slide tray; and c) a receive hopper for receiving the batch of slides from said slide tray, including means for serially stacking slides received from said slide tray.

16. The apparatus as set forth in claim 15 wherein said opposed channels are longitudinally aligned with said tongue means.

17. The apparatus as set forth in claim 15 wherein said stacking means includes a plate for locating a slide received from said slide tray and means for translating the slide located by said plate to said receive hopper.

18. The apparatus as set forth in claim 17 wherein said receive hopper includes a mouth for receiving each slide and spring means for accommodating translation of a slide into said mouth and for restricting movement of a slide out of said mouth.

19. The apparatus as set forth in claim 17 wherein said translating means includes at least one prong extendable through said plate for translating the slide to said receive hopper.

20. The apparatus as set forth in claim 19 including means for extending each of said at least one prongs from a first position wherein the slide is located adjacent said plate to a second position wherein the slide has been translated into said mouth of said receive hopper and for returning said at least one prong to the first position.

21. The apparatus as set forth in claim 20 wherein said extending means includes an electric motor, a jack screw rotatable by said electric motor, a coupling in threaded engagement with said jack screw and supporting said at least one prong and means disposed in said plate for engaging said at least one prong to prevent rotation of said coupling in response to rotation of said jack screw.

22. Apparatus for serially feeding slides through slide imaging equipment, said apparatus comprising in combination:

a) a slide tray for transporting slides serially through the slide imaging equipment;

b) a feed hopper for providing a batch of slides to said slide tray, including reciprocating tongue means for serially transporting slides from said feed hopper to said slide tray; and c) a receive hopper for receiving the batch of slides from said slide tray, including means for serially stacking slides received from said slide tray, said slide tray including an outlet for serial downward discharge of each slide to said stacking means in response to transport of each slide through said slide tray.

23. The apparatus as set forth in claim 22 wherein said slide tray includes means for accommodating tilting of each slide prior to discharge and further means for accommodating untilting of each slide in response to transport of a succeeding slide to effect downward discharge of the untilted slide in response to the force of gravity.

* * * * *